United States Patent [19]

Carman

[11] 4,272,488

[45] Jun. 9, 1981

[54] APPARATUS FOR PRODUCING AND CASTING LIQUID SILICON

[75] Inventor: Justice N. Carman, Tarzana, Calif.

[73] Assignee: John S. Pennish, Los Angeles, Calif.; a part interest

[21] Appl. No.: 75,644

[22] Filed: Sep. 14, 1979

Related U.S. Application Data

[62] Division of Ser. No. 800,191, May 25, 1977, Pat. No. 4,176,166.

[51] Int. Cl.³ .................................. B01J 19/02
[52] U.S. Cl. .................................. 422/199; 422/241
[58] Field of Search ............. 422/129, 199, 240, 241; 423/349, 350

[56] References Cited

U.S. PATENT DOCUMENTS

| | | | |
|---|---|---|---|
| 2,904,404 | 9/1959 | Ellis, Jr. ............................... | 423/350 |
| 2,944,874 | 7/1960 | Irvine, Jr. ............................ | 422/199 X |
| 3,016,291 | 1/1962 | Aries ................................... | 423/350 |
| 3,733,387 | 5/1973 | Kugler et al. ....................... | 423/336 |
| 4,102,985 | 7/1978 | Harvey ................................ | 423/350 |

*Primary Examiner*—William A. Cuchlinski, Jr.

[57] ABSTRACT

The method and apparatus for producing liquid silicon of high purity and for casting silicon. Hydrogen and a hydrogenated silane in gaseous state are mixed, preferably with a source of a small amount of oxygen, in a heated chamber producing the liquid silicon, with the exhaust gases bubbling out of the melt under a baffle. The chamber for the melt of liquid silicon preferably is lined with silicon dioxide. The liquid silicon may be used in making high purity vitreous silica and may be used in making castings of silicon. In making castings, the liquid silicon is accumulated in a second chamber and is periodically drawn from the second chamber into a third chamber which contains the mold for the casting.

7 Claims, 1 Drawing Figure

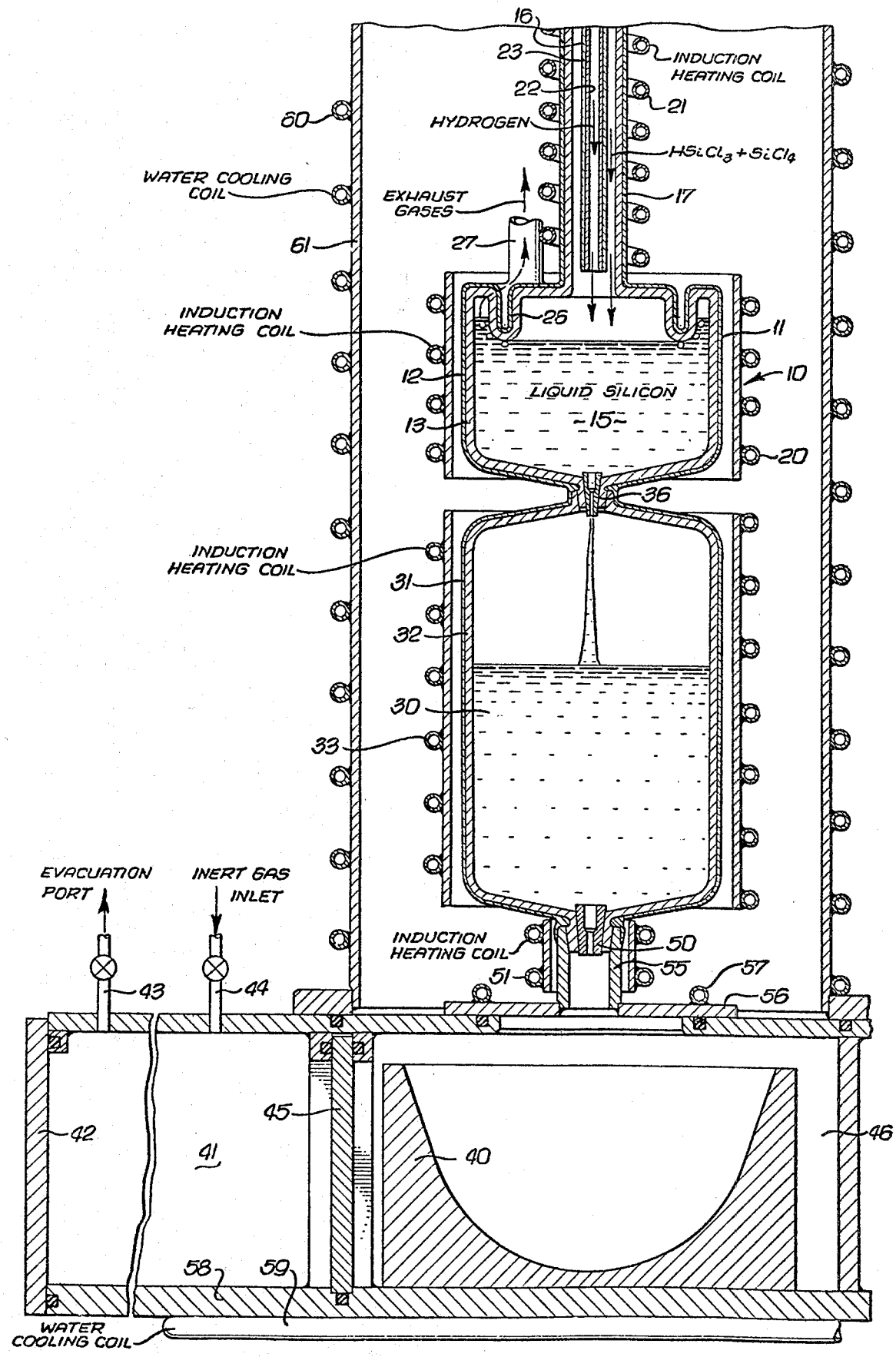

APPARATUS FOR PRODUCING AND CASTING LIQUID SILICON

This is a division of application Ser. No. 800,191, filed May 25, 1977, now U.S. Pat. No. 4,176,166, issued Nov. 27, 1979.

BACKGROUND OF THE INVENTION

This invention relates to method and apparatus for making liquid silicon of high purity suitable for use in the production of vitreous silica as described in may copending application, METHOD AND APPARATUS FOR MAKING VITREOUS SILICA. Ser. No. 684,108 filed May 7, 1976, now U.S. Pat. No. 4,054,641, issued Oct. 18, 1977, and for making castings of silicon. The cast silicon may be in the form of billets for crystal pullers, in the form of tubes and boat for use in semiconductor processing equipment, in the form of infrared transmission windows, and the like.

The subject of vitreous silica is discussed extensively in the Encyclopedia of Chemical Technology, 2nd Ed. Vol. 18 by Kirk-Othmer at pages 73–105. Various types of silica glasses are discussed in the article Properties and Structure of Vitreous Silica by R. Bruckner in Journal of Non-Crystalline Solids 5(1970) 123-175. This article identifies four types of silica glasses by the manner in which they are produced and also refers to a fifth type produced in a plasma flame.

The silicon produced by the prior art processes and apparatus suffers from various disadvantages, primarily that of purity. It is an object of the present invention to provide a method and apparatus for producing liquid silicon the purity of which is limited only by that of the input materials.

SUMMARY OF THE INVENTION

The present invention provides method and apparatus for producing liquid silicon and silicon castings the purity of which is limited only by the purity of the starting materials.

Streams of hydrogen and halogenated silane in gaseous state are mixed in a heated chamber to produce liquid silicon. The exhaust gases are bubbled out of the melt under a baffle, and the chamber preferably is lined with silicon dioxide.

The liquid silicon may be drawn from the first chamber into a second chamber wherein liquid silicon is accumulated for the purpose of making castings, with the liquid silicon being drawn from the second chamber into a mold at periodic intervals. Alternatively, the liquid silicon may be utilized in making a high purity vitreous silica as described in the aforesaid copending application.

BRIEF DESCRIPTION OF THE DRAWING

The single FIGURE of the drawing is a sectional view of an apparatus for producing and casting liquid silicon.

DESCRIPTION OF THE EMBODIMENTS

The apparatus includes a source 10 of liquid silicon with the preferred form shown in the drawing. A container 11 has an outer wall 12 of a refractory metal such as tungsten or molybdenum and an inner lining 13 of fused quartz. The container may be made by fabricating fused quartz in the desired configuration and then plasma spraying the metal outer layer thereon. A pool of liquid silicon 15 is produced by mixing a stream of hydrogen in line 16 and a stream of trichlorosilane in line 17. The silicon is heated above its melting point 1685° K., as by means of an induction heating coil 20 positioned about the chamber 11. If desired, silicon tetrachloride can be used in combination with or in place of the trichlorosilane. Other halogenated silanes may be used, but most are more expensive and/or more difficult to handle. The two named are the only ones presently known to be available in commercial quantities.

The incoming gases in the tubes 16, 17 are heated by another induction heating coil 21, with the tube 16 preferably having a tungsten inner lining 22 and a fused quartz outer layer 23. The excess gases from the reaction which forms the liquid silicon bubble outward around a baffle 26 and are removed as exhaust gases through outlet line 27.

A second chamber 30 is positioned below the chamber 11 and preferably is made in the same manner as the upper chamber 11 with an outer wall 31 of a refractory metal and an inner lining 32 of fused quartz. The chamber 30 may be heated by another induction heating coil 33.

An orifice, preferably in an insert 36 at the junction between the upper chamber 11 and lower chamber 30, provides continuous flow of a fine stream of liquid silicon into the chamber 30. Typically the insert is made of a high temperature resistant material such as silicon carbide.

The silicon produced in the chamber 11 may be drawn directly from the chamber for further use, such as in the making of vitreous silica disclosed in my copending application, for making castings and for other uses as desired. When making castings, it is preferred to use the chamber 30 for accumulating a quantity of the liquid silicon sufficient for the desired casting, with the liquid silicon added to the chamber 30 from the chamber 11 in a substantially continuous stream, while being drawn from the chamber 30 periodically for filling a mold.

One mold handling configuration is shown in the drawing. It is desirable to perform the casting operation in an inert atmosphere. This may be accomplished by inserting a mold 40 into a first chamber 41 through a door 42. With the door closed, the chamber 41 is evacuated through line 43 and is them filled with an inert gas through line 44. A sliding door 45 is then opened permitting movement of the mold from the chamber 41 to another chamber 46, positioning the mold below an outlet of the chamber 30.

An orifice, preferably in an insert 50 at the lower end of the chamber 30, provides flow of liquid silicon from the chamber into the mold. Typically the insert is made of a high temperature resistant material such as silicon carbide. An induction heating coil 51 is positioned around the insert and may be used for controlling flow through the orifice. With the power to the heating coil 51 off, the silicon solidifies at the orifice and blocks flow from the chamber 30. When it is desired to make a casting, the heating coil 51 is energized, liquifying the silicon at the orifice and permitting flow of liquid silicon from the chamber 30 into the mold 40. When the mold is filled to the desired level, the power is turned off for the coil 51 permitting the silicon to freeze in the orifice. The mold is now ready for removal from the chamber 46. It may be removed through the chamber 41, or another exit chamber may be provided so that an empty mold can be introduced via the chamber 41 thereby reducing the time interval between pourings.

The mold typically is made of titanium because of its high melting point, with the inner surface preferably coated with a layer of silica which may be sprayed thereon. Alternatively, the mold may be of silicon with a silica lining. As another alternative, the mold may be entirely of silica similar to the standard crucibles used for Czochralski crystal growing. The portion of the structure adjacent the orifice outlet, including the sleeve 55 and the plate 56 preferably are made of a refractory metal such as tungsten, and a water cooling coil 57 may be mounted on the plate 56. Other portions of the chambers 41, 46 may be made of steel or other metals as desired. The plate 58 forming the bottom of the chambers 41 and 46 may be cooled by a water cooling coil 59. Cooling for the chambers 11 and 30 may be provided by another water cooling coil 60 carried on a sleeve 61 positioned about the chambers.

The chamber 11 is heated to maintain the silicon in a molten state, typically in the range of 1700° to 1900° K. It is desirable that the reactant gases be preheated prior to entering the chamber 11 for enhancing the reaction and this may be accomplished by the induction heating coil 21. Other methods of gas preheating may be utilized, but it is preferred to have the separate gas streams enter the chamber directly over the liquid silicon. The incoming gas streams provide a pressure in the chamber 11 which aids in ejecting the stream of liquid silicon into the chamber 30.

While the present invention is directed to method and apparatus for making pure silicon, various modifiers and dopants may be incorporated if desired. When the end product is to be an oxide, such as silica, modifiers are often used. Certain modifiers are given below by way of example and are not intended to limit the range of modifiers.

The sag point of fused silica may be raised about 100° K. by adding in the order of 0.20 to 0.25% alumina to the silica. This may be accomplished by including an aluminum halogen, such as aluminum chloride, in the trichlorosilane gas input.

The inclusion of about 10% titania reduces the coefficent of thermal expansion of silica from $55 \times 10^{-8}$ to approximately zero. Titania also increase the index of refraction of silica. Titania may be added in the form of titanium tetrachloride.

The incorporation of about $\frac{1}{4}$ to $\frac{1}{2}\%$ of neodymium oxide produces a silica suitable for use as a laser glass. The neodymium may be introduced as neodymium chloride. All of these metallic halogens becomes gaseous when heated and are easily handled in the apparatus disclosed herein.

When the end product is to be a semiconductor, dopants can be used. Typical dopants are boron, aluminum, gallium, phosphorous, arsenic and antimony, which are used in conventional quantities for semiconductors. The dopant may be introduced in gaseous compound form in the silane gas stream, typical compounds being diborane, phosphene and arsene.

Silica has a solubility in molten silicon in the order of 1–10 parts per million. Hence when a silica lining is used for a chamber containing molten silicon, such as the chamber 11, the molten silicon tends to erode the wall over a period of time. This erosion effect may be reduced or eliminated by maintaining the molten silicon saturated with oxygen.

In the embodiment disclosed herein, this may be accomplished by adding a small amount of water vapor to the hydrogen streams. It is preferred to provide a silica lining inside the tungsten 22 of tube 16 to protect the metal from the oxidizing effect of the water vapor.

In an alternative mode, a small amount of an oxysilane, in the order of 1–b ppm, may be included with the halogenated silane to provide the oxygen for the silicon.

The optimum amount of the oxygen source material is best determined by experiment with the specific apparatus being used.

I claim:

1. In an apparatus for continuously making silicon, the combination of:
    means defining a first chamber for liquid silicon with no fixed targets in said first chamber;
    means positioned about said first chamber for heating said first chamber from the exterior thereof;
    means for directing a stream of hydrogen and a stream of at least one gaseous halogenated silane into said first chamber so that said stream mix together in said first chamber;
    means for removing exhaust gases from said first chamber;
    means defining a second chamber separate from said first chamber for accumulating liquid silicon; and
    means interconnecting said first and second chambers for flow of liquid silicon from said first chamber to said second chamber.

2. The apparatus as defined in claim 1 including a divider depending downward from the upper surface of said first chamber separating the incoming streams and the exhaust gases.

3. The apparatus as defined in claim 1 wherein said first chamber has an outer refractory metal shell and an inner lining of silicon dioxide.

4. The apparatus as defined in claim 1 wherein said first and second chambers have an outer refractory metal shell and an inner lining of silicon dioxide.

5. The apparatus as defined in claim 1 including:
    a third mold supporting chamber positioned below said second chamber;
    first means providing a flow passage from the lower portion of said second chamber to said third chamber for flow of liquid silicon from said second chamber into said third chamber; and
    second means for heating said first means for liquifying silicon therein.

6. The apparatus as defined in claim 1 wherein said means for directing streams into said first chamber include metal tubes with silicon dioxide lining and an induction heating coil positioned about said tubes.

7. The apparatus as defined in claim 6 with one of said tubes positioned within the other of said tubes and with a helical heating coil positioned about said tubes.

* * * * *